United States Patent [19]
Geffcken et al.

[11] 4,105,288
[45] Aug. 8, 1978

[54] LIQUID CRYSTAL DISPLAY WITH BISTABLE CHOLESTERIC LIQUID CRYSTAL LAYER

[75] Inventors: Walter Geffcken; Hans Krueger, both of Munich; Karl-Heinz Walter, Grafing, all of Germany

[73] Assignee: Siemens Aktiengesellschaft, Berlin & Munich, Germany

[21] Appl. No.: 723,147

[22] Filed: Sep. 14, 1976

[30] Foreign Application Priority Data
Sep. 22, 1975 [DE] Fed. Rep. of Germany ....... 2542189

[51] Int. Cl.² .............................................. G02F 1/13
[52] U.S. Cl. ..................................... 350/350; 350/333
[58] Field of Search ......................... 350/160 LC, 161; 313/516, 517

[56] References Cited
U.S. PATENT DOCUMENTS

| 3,966,305 | 6/1976 | Young | 350/160 LC |
|---|---|---|---|
| 4,023,890 | 5/1977 | Shirasu | 350/160 LC |

Primary Examiner—Samuel W. Engle
Assistant Examiner—Donald P. Walsh
Attorney, Agent, or Firm—Hill, Gross, Simpson, Van Santen, Steadman, Chiara & Simpson

[57] ABSTRACT

A liquid crystal display incorporates a pair of spaced carrier plates separating a layer of liquid crystal material, both of the plates having a set of selection conductors on their inside surfaces, defining a display matrix of visual elements, and a plurality of boundary electrodes connected with one or both sets of selection conductors surrounding each individual visual element.

7 Claims, 6 Drawing Figures

LIQUID CRYSTAL DISPLAY WITH BISTABLE CHOLESTERIC LIQUID CRYSTAL LAYER

BACKGROUND

1. Field of the Invention

The present invention relates to liquid crystal displays, and more particularly to such displays which have a bistable characteristic.

Reports of the Bunsen Society, Volume 9, 1974, pages 912–914 describes a liquid crystal arrangement in the form of a matrix with a plurality of locations or visual elements which can be identified by unique row and column positions. The display unit uses a liquid crystal with a positive anisotropic dielectric constant.

The liquid crystal material used with the matrix display demonstrates the bistability effect under certain boundary conditions. When the applied electric field sees a threshold value of $E_{cn}$ the material passes out of its energetically stable (focal-conical) structure into a homeotropic-nematic orientation. This orientation is maintained until the electric field is reduced below a second threshold value of $E_{nc}$, with a brief formation of a planar-conical intermediate state. A value of hysteresis is exhibited between $E_{cn}$ and $E_{nc}$ values, and the ratios of the field intensities for these threshold values can be as high as 3 to 1. Under certain circumstances, it is possible to make the lower threshold value equal to zero. In this special case, in which the characteristic cholesteric helical structure must be in a specific relationship to certain parameters of liquid crystal substance, not only a homeotropic-nematic texture but also a planar-conical one are stable next to each other in a field-free state. Both phases can be transformed into the other. For example, if the susceptibility anisotropy of the liquid crystal substance changes its sign as a function of frequency, a change of frequency can transform one phase into the other.

If an intermediate electric field is maintained between the two threshold values, the state of any portion of the liquid crystal (LC) display can be maintained for long time periods, and in increase in the so-called multiplex ratio is realized. The multiplex ratio is the ratio between the possible storage time and the required write-in time.

In practice, the time in which the elements of the LC display can be maintained in a given state is restricted, primarily because of the fact that the energetically stable focal-conical phase gradually intrudes into the homeotropic-nematic phase. This begins at locations where impurities are located, and gradually invades the nematic region.

One way of increasing the time during which a state may be maintained is by the especially careful cleaning of the plate surfaces, in order to reduce and eliminate as much as possible the impurities which may be present. It is also been suggested to hold the electric field at certain parts of the display at a constant value, so that the liquid crystal remains nematic at these locations. However, no electrode structure has heretofor been suggested for producing such a field.

BRIEF DESCRIPTION OF THE PRESENT INVENTION

A principal object of the present invention is to provide a mechanism for reducing the invasion of the focal-conical phase into the homeotropic-nematic phase, to extend the lifetime of the LC stable state.

A further object of the present invention is to provide a LC display with means for increasing the multiplex ratio of the display.

A further object of the present invention is to provide a LC display with a bistable cholesteric LC layer in which indestructable nematic regions are provided at the boundaries of visual elements of the display.

A further object of the present invention is to provide such a display device which can be economically and simply produced and which is free of undesirable side effects.

In accordance with one form of the present invention, there is provided an LC display in which two sets of selection conductors define a visual matrix in the display, with either set having boundary electrodes enclosing the visual elements of the display, the boundary electrodes being constructed in the shape of a ladder and projecting so far toward the carrier plate line on the opposite side of the LC that a minimum field strength greater than or equal to $E_{cn}$ can prevail in the LC layer at the location of the boundary zone, and simultaneously a retention field strength can prevail at the location of the image segment enclosed by the boundary zone.

In another embodiment of the present invention, an LC display is provided having two sets of selection conductors disposed on opposite sides of an LC layer, intersections of the column lines and row lines defining a number of visual elements of the display, the central portion of at least one of the selection conductors being covered, in the area of a visual element, with an island of dielectric material, with a conductive boundary zone surrounding the island, the dielectric layer having a dielectric constant which is less than that of the LC layer, and extending toward the opposite face of the LC layer, such that a minimum field strength equal to or greater than $E_{cn}$ can prevail in the LC layer at the location of the boundary zone, with a retention field strength in the segment surrounded by the boundary zone.

In all of the several embodiments of the present invention, the regions formed in the display which are indestructively nematic regions and which surround the individual visual elements, take the form of relatively narrow boundary zones produced by electrodes which are connected directly to the selection conductors for the associated image, and are thus at the same potential as such electrodes. This construction avoids any problems arising from the need to provide additional conductors within the LC display area, and also avoids insulation problems.

Another advantage of the arrangement of the present invention is that relatively small power losses and voltage drops are realized with the present invention.

These and other objects and advantages of the present invention will become manifest upon an examination of the accompanying drawings and the following description.

BRIEF DESCRIPTION OF THE DRAWINGS

Reference will now be made to the accompanying drawings.

DESCRIPTION OF THE PREFERRED EMBODIMENTS

Figure 1:
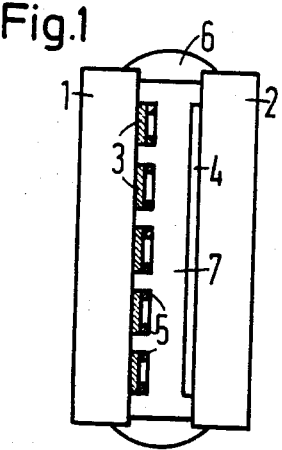
FIG. 1 is a transverse cross-section of an LC display unit incorporating an illustrative embodiment of the present invention.

Referring now to FIG. 1, a transverse cross-section of an LC display unit incorporating an illustrative embodiment of the present invention is illustrated. Two carrier plates 1 and 2 are provided, each of which carry an array of selection conductors on their inner surfaces facing one another. The two arrays are arranged parallel to each other and about 100 micrometers from each other, with the conductors formed as strips 3 and 4, with the strips of each array arranged perpendicular to each other, so that an image matrix is constructed in which the conductive strips on one plate are row conductors, and the conductive strips on the other plate are column conductors. The locations of the matrix defined by individual combinations of row and column conductors form independent visual elements of the display image.

Figure 2:
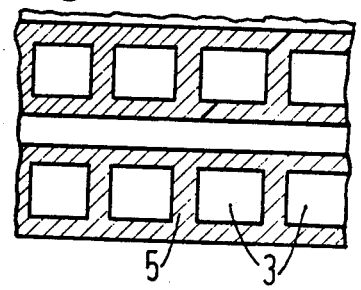
FIG. 2 is a plan view of one of the carrier plates incorporated in the apparatus illustrated in FIG. 1.

In the embodiment of FIG. 1, the conductive strips are uniformly rectangular in cross-section, while a plurality of recesses are provided in the inner surface of the conductive strips 3, so as to form spaced hollowed out portions, each of which is aligned with the transverse strips 4. A plan view of the face 1 including a strip 3 is illustrated in FIG. 2, where it is seen that the uppermost surface of the strips (shown crosshatched for clarity) is constructed in a ladder arrangement, with the ladder portion of the strip projecting toward the opposite plate 2.

The plates 1 and 2 are connected together at their edges by means of a glass solder frame 6, so that the plates 1 and 2 are separated from each other by a distance of about 15 micrometers, to form a chamber. An LC layer 7 is formed between the plates 1 and 2 by filling the chamber with LC material through an opening (not shown), after which the chamber is closed off and sealed hermetically from the surrounding environment.

The plates 1 and 2 are preferably formed of glass and the conductive strips 3 and 4 are preferably formed of $SnO_2$ or $Sn_2O_3$. The glass solder frame 6 is formed of a glass solder with a low melting point, and the LC layer is formed of a neumatic azoxy compound with 7 to 20 percent of commercially available cholesteryl chloride (ZLI 319 of the Merck Company) or of a Schiff's base (RO-TN 200 of the HoffmanLa Roche Company) with a suitable cholesteric additive. If desired, a dichroic dye material can also be admixed to the LC substance, for improving contrast and or/for creating a color representation.

In use, the information is written into the display a line at a time. All of the line conductors are normally held at a potential such that a retention field $E_h$ is established throughout the entire matrix, even though the column conductors are not all at the same potential. As each line is written, the potential of that line is changed so that the field intensity passes through a threshold value at the locations corresponding to column conductors having a given potential applied thereto, but not at the other locations. The field intensity at the elements which are written is preferably brought to either zero, to twice the value of the retention field $E_h$. The several lines of the matrix are written successively in the same manner, and after all of the lines of the matrix are written, the line conductive for the first line is again energized, with the process repeating successively.

The field strength $E_h$ is in the range of 0.6 to 1.2 volts per micrometer. The time required for energization of the elements in each line depends on the switching time for the elements of the visual display, and is typically about 100 to 200 miliseconds.

If desired, the entire matrix may be brought into the focalconical state (in which the field intensity equals zero) before any part of the matrix is caused to switch to its nematic state. Subsequently, the retention field $E_h$ is again established at all matrix points. The information is written in, a line at a time, in a way that the field $3E_n$ is applied to the image points which are to become nematic. By this process, the line selection time is reduced to 30 to 50 miliseconds.

In a further alternative procedure, the entire matrix is made nematic with a suitable voltage pulse applied to the selection conductors, after which $E_h$ is established at all matrix image points. The information is then written in a line at a time, with selected visual elements transformed to focal-conical. The line selection time when this arrangement is employed is about 20 to 30 miliseconds, and is determined by the more rapid switching time from the nematic to the focal-conical state. Further operating and production details are described in German Offenlegungsschrift No. 23 61 421.

Figure 3:
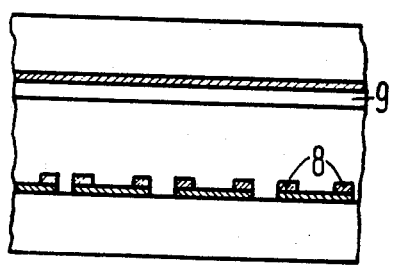
FIG. 3 is a transverse cross-section of a portion of an alternative embodiment of the present invention.

The arrangement of FIG. 3 differs from that illustrated in FIGS. 1 and 2 in that the image strip conductors for both the line and column conductors are formed of longitudinal strips each having a uniform U-shape cross-section. The base of the U is a regular rectangular cross-section of the conductive elements 3 and 4, but narrow conductive strips 8 are applied to the edges of the conductive strips of one of the arrays, while corresponding strips 9 are applied to the edges of the conductive strips of the other array. Since the narrow strips of bars 8 and 9 extend further toward each other than to the other portions of the row and column conductors, the electric field strength is different in these locations, which are adapted to surround individual visual points of the display. The arrangement of FIG. 3 is somewhat more economical to manufacture, but requires a relatively precise interval between the plates 1 and 2. It also does not show a completely homogenous field distribution at the individual image points, because the field appears to be more concentrated in each of the four corner points of the boundary zone.

Figure 4:
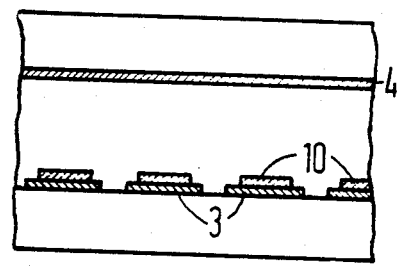
FIG. 4 is a transverse cross-section of an LC display unit incorporating yet another embodiment of the present invention.
Figure 5:
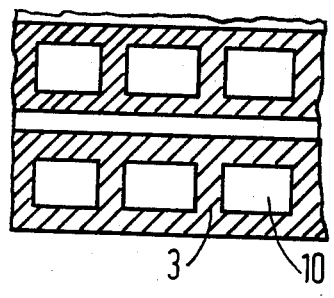
FIG. 5 is a plan view of a portion of a carrier plate incorporated in the embodiment of FIG. 4.

FIGS. 4 and 5 illustrate a third embodiment of the present invention, in which the conductors 3 are provided with a plurality of spaced islands 10 of dielectric material, aligned with the cross conductors 4. The islands are located at the locations of the visual elements of the display. The thickness and the dielectric constant of the islands are such that the retention field $<E_{cn}$ prevails in the LC layer in the location of the image area, and a field strength of $>E_{cn}$ simultaneously prevails at the areas of the boundary zones, which surround the image areas.

Figure 6:
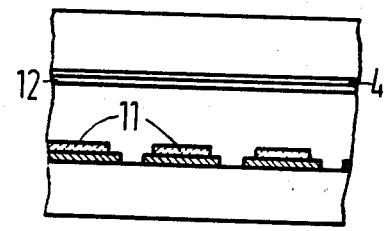
FIG. 6 is a transverse cross-section of an LC display unit incorporating yet another embodiment of the present invention.

FIG. 6 shows a variation of the arrangement of FIGS. 4 and 5, in which each of the conductive strips 3 and 4 are provided with a centrally located dielectric strip 11, so that visual elements of the image are defined by the intersections of the insulating strips 11 and 12.

Since the strips 11 and 12 do not extend to the side edges of the strips 3 and 4, there is a margin in the space on both sides of the strips 11 and 12 which has a more intense field distribution in the LC chamber, than the image areas interposed between the strips 11 and 12. The operation of the apparatus of FIG. 6 functions in the manner described in connection with the apparatus of FIGS. 4 and 5, except that the thickness of the islands 10 is divided between the strips 11 and 12 on both sets of conductors.

The arrangement of FIG. 6 is especially advantageous because it is relatively easy to construct, and is free of insulation problems and any problems resulting from possible short circuits. The thickness of the central insulating strips is such that a retention field can be maintained in the image areas between the strips 3 and 4, with a field strength of greater than $E_{cn}$ produced in the area between the boundary strips.

Although the present invention has been described in connection with matrix display arrangements, it is possible to use the present invention in other types of displays. The present invention is suitable for any LC display in which information is to be stored for relatively long periods by application of a retention field. For example, alphanumeric characters may be displayed on a bistable basis, incorporating segmented conductors on one carrier plate with a continuous electrode on the other plate.

Although the present invention has been described in connection with triggering of displays by means of electric fields, it is also possible to trigger the displays with magnetic fields, and in this case, an LC layer is preferred which has, within a certain frequency range, a positive anisotropic, magnetic susceptibility.

In the LC display, according to the present invention, the display area outside the visual elements are constantly in a cholesteric or focal-conical state, so usually the cholesteric orientation will be selected for the background of the image, including the darkened image segments, with the nematic orientation being selected for the individual segments of the image itself. When the writing of the display is done by changing the visual elements to their nematic state, dependent upon the information, then relatively little triggering expense is required, although the writing voltage is limited in an upward direction to about three times the retention voltage. This imposes limits on the writing speed.

Alternatively, the information can be displayed by cholesteric writing of the image background, instead of by nematic writing of the image, in order to take advantage of the faster writing speed.

In another embodiment of the present invention, strips of insulating material are superposed on the side edge margins of the strip conductors 3 and 4, to intensify the field at this region of the liquid crystal layer, in the manner shown in FIG. 3. The dielectric constant of this material must be greater than that of the liquid crystal layer, rather than less in the arrangements heretofore described in connection with FIGS. 3-6.

It will be apparent other various modifications and additions may be made in the apparatus of the present invention by those skilled in the art without departing from the essential features of novelty involved which are intended to be defined and secured by the appended claims.

What is claimed is:

1. A liquid crystal display for the representation of visual images having two carrier plates with a layer of cholesteric liquid crystal therebetween in a hermetically sealed arrangement, each of said carrier plates having an array of image conductors on its inner surface facing the other, said liquid crystal having at least in a certain frequency range a positive anisotropic susceptibility, and at field strengths equal to or greater than a first threshold value $E_{cn}$ taking on a homeotropically-nematic texture, in which it remains as long as the applied field is greater than a second threshold value $E_{nc}$, $E_{nc}$ being smaller than $E_{cn}$, said arrays of image conductors having at least one separately operable conductor, at least one of said arrays of image conductors being connected with boundary electrodes arranged to generate, relative to the opposite electrode in the liquid crystal layer, a field strength equal to or greater than $E_{cn}$, said boundary electrodes forming a narrow boundary zone completely surrounded by a visual element area, said boundary electrodes each being connected directly to the associated image conductor of said visual element area and projecting so far toward the opposite carrier plate that a minimum field strength equal to or greater than $E_{cn}$ can prevail in said liquid crystal layer at the location of the boundary area and simultaneously a field strength less than $E_{cn}$ and greater than $E_{nc}$ can prevail in said visual element area.

2. Apparatus according to claim 1, wherein the boundary electrodes are in the form of raised ladder-shaped conductive portions on the conductor array of one of said carrier plates.

3. Apparatus according to claim 1, wherein said boundary electrodes are applied as longitudinal strips at the side edges of the conductors of both arrays, whereby every location in the boundary zone surrounding a visual element is aligned with a longitudinal strip on at least one of said plates.

4. A liquid crystal display for the representation of visual images having two carrier plates with a layer of cholesteric liquid crystal therebetween in a hermetically sealed arrangement, each of said carrier plates having an array of image conductors on its inner surface facing the other, said liquid crystal having at least in a certain frequency range a positive anisotropic susceptibility, and at field strengths equal to or greater than a first threshold value $E_{cn}$ taking on a homeotropically-nematic texture, in which it remains as long as the applied field is greater than a second threshold value $E_{nc}$, $E_{nc}$ being smaller than $E_{cn}$, said arrays of image conductors having at least one separately operable conductor, at least one of said arrays of image conductors being connected with boundary electrodes arranged to generate, relative to the opposite electrode in the liquid crystal layer, a field strength equal to or greater than $E_{cn}$, said boundary electrodes forming a narrow boundary zone completely surrounded by a visual element area, said boundary electrodes each being connected directly to the associated image conductor of said visual element area, said boundary electrodes being formed integrally with said conductor arrays, and comprising side edge margins of conductors within said arrays, a dielectric layer superposed on portions on the conductors of one array having a dielectric constant smaller than that of said liquid crystal layer, whereby a minimum field strength equal to or greater than $E_{cn}$ is produced in the liquid crystal layer at the location of the boundary zone, simultaneously with a retention field in the visual element area.

5. Apparatus according to claim 4, wherein said dielectric layer is applied in the form of a plurality of separated islands on a conductor of one of said arrays at locations aligned with said visual elements, said boundary electrodes defined by side edge margins of said conductor not covered with said islands.

6. Apparatus according to claim 4, wherein said dielectric layer comprises a centrally located strip of dielectric material superposed on a conductor of both of said arrays, said boundary electrodes defined by side edge margins of said conductor not covered with said strip.

7. A liquid crystal display for the representation of visual images having two carrier plates with a layer of cholesteric liquid crystal therebetween in a hermetically sealed arrangement, each of said carrier plates having an array of image conductors on its inner surface facing the other, said liquid crystal having at least in a certain frequency range a positive anisotropic susceptibility, and at field strengths equal to or greater than a first threshold value $E_{cn}$ taking on a homeotropically-nematic texture, in which it remains as long as the applied field is greater than a second threshold value $E_{nc}$, $E_{nc}$ being smaller than $E_{cn}$, said arrays of image conductors having at least one separately operable conductor, at least one of said arrays of image conductors being connected with boundary electrodes arranged to generate, relative to the opposite electrode in the liquid crystal layer, a field strength equal to or greater than $E_{cn}$, said boundary electrodes forming a narrow boundary zone completely surrounded by a visual element area, said boundary electrodes each being connected directly to the associated image conductor of said visual element area, said boundary electrodes comprising longitudinal strips of a dielectric material superposed on the boundary zone of a conductor of one of said arrays, said dielectric material having a dielectric constant which is greater than that of said liquid crystal layer, whereby a minimum field strength equal to or greater than $E_{cn}$ is produced in the liquid crystal layer at the location of the boundary zone, simultaneously with a retention field in the visual element.

* * * * *